(12) United States Patent
Goteti et al.

(10) Patent No.: US 7,782,203 B2
(45) Date of Patent: Aug. 24, 2010

(54) STRONG TYPING OF COMPONENTS IN RFID BUSINESS PROCESSES

(75) Inventors: Janaki Ram Goteti, Hyderabad (IN); Ramachandran Venkatesh, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 718 days.

(21) Appl. No.: 11/692,329

(22) Filed: Mar. 28, 2007

(65) Prior Publication Data

US 2008/0238618 A1 Oct. 2, 2008

(51) Int. Cl.
*G08B 13/14* (2006.01)
(52) U.S. Cl. .................. 340/572.1; 340/10.1; 340/10.5; 340/505
(58) Field of Classification Search .................. 340/572, 340/10, 505
See application file for complete search history.

(56) References Cited

U.S. PATENT DOCUMENTS

| 2006/0047464 A1* | 3/2006 | Kumar et al. ............... 702/122 |
| 2006/0047545 A1 | 3/2006 | Kumar et al. |
| 2006/0047789 A1* | 3/2006 | Kumar et al. ............... 709/220 |
| 2006/0053234 A1 | 3/2006 | Kumar et al. |
| 2006/0058987 A1 | 3/2006 | Agarwal et al. |
| 2006/0092015 A1 | 5/2006 | Agrawal et al. |
| 2006/0109126 A1* | 5/2006 | Yegnan et al. ............ 340/572.1 |
| 2006/0133412 A1 | 6/2006 | Callaghan |
| 2006/0186998 A1 | 8/2006 | Lin et al. |
| 2006/0187048 A1 | 8/2006 | Curkendall et al. |
| 2007/0027966 A1* | 2/2007 | Singhal et al. ............... 709/220 |

FOREIGN PATENT DOCUMENTS

WO 2006068338 A1 6/2006

OTHER PUBLICATIONS

International Search Report and Written Opinion for PCT Patent Application No. PCT/US2008/055010, dated Jul. 9, 2008, 10 pages.
Chilean OA dated Nov. 13, 2009 for CL Application Serial No. 846-2008, 2 pages.
Bornhovd, et al. "Integrating Automatic Data Acquisition with Business Process Experiences with SAP's Auto-ID Infrastructure" (2004) Proceedings of the 30th VLDB Conference, 7 pages.
Quaadgras. "Who Joins the Platform? The Case of the RFID Business Ecosystem" (2005) Proceedings of the 38th Hawaii International Conference on System Science, 10 pages.
Koundinya, et al. Modeling Event Driven Applications with a Specification Language (MEDASL), ACM, 2 pages, Oct. 2004.

\* cited by examiner

*Primary Examiner*—Travis R Hunnings
(74) *Attorney, Agent, or Firm*—Turocy & Watson, LLP

(57) ABSTRACT

The claimed subject matter provides a system and/or a method that facilitates verifying data within a radio frequency identification (RFID) business process. A radio frequency identification (RFID) business process can include at least one component that can receive an event from a logical source. A strong typing module can employ strong typing of the component to define at least one of an event type for the component, an input event type for the component, or an output event type for the component.

20 Claims, 10 Drawing Sheets

STRONG TYPING OF COMPONENTS IN RFID BUSINESS PROCESSES

BACKGROUND

Many retail, manufacturing, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g. more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g. distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g. tag transceivers), tag writers, tag-programming stations, circulation readers, sorting equipment, tag inventory wands, RFID printers, etc. Establishing an RFID system within a distribution and/or manufacturing environment can be an overwhelming and meticulous task. In particular, configuring various processes, applications, and/or instructions for such systems at a conceptual level can be complicated by the immense amount of devices, components, repetitive settings and/or properties respective to such devices and components, and/or any other particularities associated with a potential client's environment.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate employing strong typing with at least one component associated with an RFID process. A strong typing module can receive data via an interface and based on such data, the strong typing module implements a strong typing of a component related to a radio frequency identification (RFID) process. The strong typing module can allow a user, a process author, an author, a component author, a machine, an independent software vendor (ISV), a software manufacturer, a third-party software producer, a programmer, most any suitable machine and/or user that can create a portion of an RFID process, etc. to define an event type, an input event type, or an output event type to be utilized by a component. In addition, the strong typing module can employ an algorithm to traverse a process pipeline and ensure matching of an event type between an adjacent component (e.g., event handler), detection of an unreachable component (e.g., event handler), reporting an error associated with a component and an event and/or a component and the processing pipeline, a data structure and/or an algorithm to put an event through a processing pipeline at runtime, filtering based on a relevant type, and/or aggregation of most any type of event. Additionally, the strong typing module can provide the strong typing of components explicitly and/or at runtime prior to the deployment of the RFID process.

In accordance with one aspect of the claimed subject matter, the implementation of strong typing of a component can optimize data verification and error-checking in connection with the RFID process. In particular, the strong typing module can utilize a verify component (e.g. a module within and/or utilized by the strong typing module) that can facilitate reducing errors. The verify component can detect an orphaned event since each event includes a defined/specified type which identifies a linkage and/or association with a particular component. Moreover, the verify component can verify a processing pipeline is of correct composition when the process is started (e.g., if the verification succeeds, the process can be started and if not the process is not started). Furthermore, the verify component can detect whether each component in the processing pipeline receives an event, if the component is bound to a logical source, and the logical source itself receives an event. In other aspects of the claimed subject matter, methods are provided that facilitate specifying a type associated with an input event and/or an output event related to at least one component within a processing pipeline.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
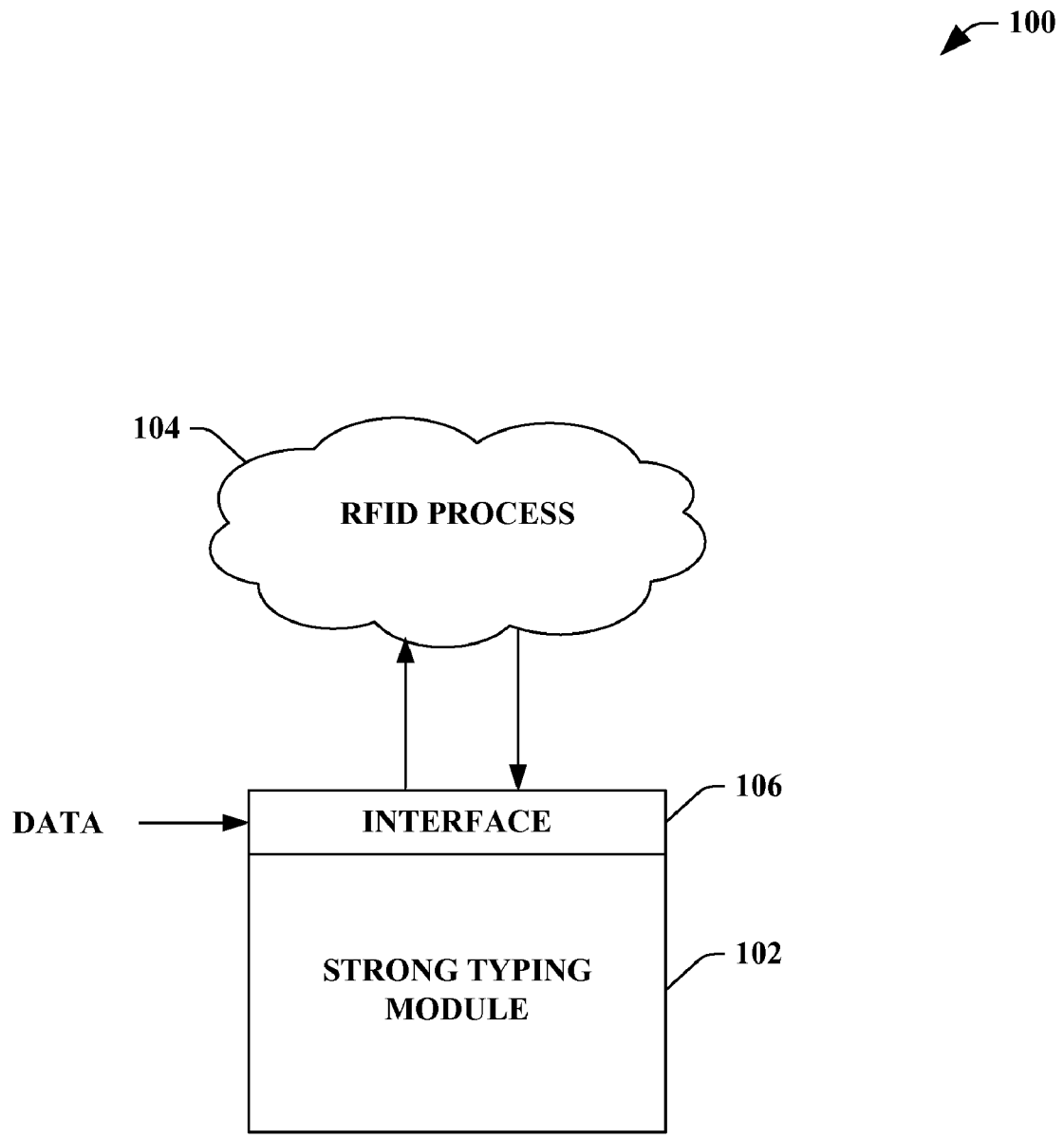
FIG. 1 illustrates a block diagram of an exemplary system that facilitates employing strong typing with at least one component associated with an RFID process.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "tag," "process," "module," "device," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates employing strong typing with at least one component associated with an RFID process. The system 100 can include a strong typing module 102 that can allow the explicit specification of an input type event and/or an output type event of at least one component associated with a radio frequency identification (RFID) process 104 (also referred to as an RFID business process 104). In other words, the strong typing module 102 can enable strong typing of a component to ensure a particular input event type is consumed by a component (e.g., an event handler) and/or a particular output event type is generated by a component (e.g., an event handler). It is to be appreciated that the strong typing can be generic enough to be applied outside of the RFID process 104 (e.g., as in a typical workflow pipeline, etc.). For example, the strong typing module 102 can allow a type of event to be specifically defined which enables a distinct and explicit manner to ensure an event is handled by a component (e.g., an event handler). In addition, the strong typing module 102 can employ at least one of the following: an algorithm to traverse a process pipeline and ensure matching of an event type between an adjacent component (e.g. event handler); detection of an unreachable component (e.g., event handler); reporting an error associated with a component and an event and/or a component and the processing pipeline; a data structure and/or an algorithm to put an event through a processing pipeline when a process is started; filtering based on a relevant type; or aggregation of most any type of event. It is to be appreciated that the strong typing module 102 can apply at least one rule to validate a process pipeline and that such validation can be prior to process startup and/or most any suitable time after the process has started.

Furthermore, the strong typing module 102 can receive data via an interface 106 (discussed infra) in order to implement strong typing of a component during design time of the RFID process 104. The received data can be, but is not limited to being, a type of input event to be consumed, a type of output event to be generated, a type of an event, a type and a component association/linkage, data received from a component author (e.g., a user, a process author, an author, a component author, a machine, a ISV, a software manufacturer, a third-party software producer, a programmer, most any suitable machine and/or user that can create a portion of an RFID process, etc.), programming data related to the RFID process, processing pipeline data, component data, internal logical element/device data, most any suitable data related to the RFID process 104, etc. The system 100 can further verify the RFID process 104 will not encounter an error with regard to event mismatches based at least in part upon the strong typing module 102 enabling the specification of at least one of the type of input event or the type of output event of each component. It is to be appreciated that the strong typing module 102 can provide the definition of an event type during a design time activity, wherein the design time activity can be the process of conceptualizing the RFID process 104 by specifying logical device elements, specifying logical sources as containers for logical device elements, and/or creating a pipeline of components (e.g., event handlers) such that a component can receive an event from a logical source. Additionally, such logical device elements can be bound and/or linked to a physical device (e.g., a device) within a physical RFID device network. It is to be appreciated that the binding can be a device binding (e.g. linking a logical entity and/or device with a physical entity) and/or a component binding (e.g. specifying values for initialization parameters of components such as internal logical elements).

It is to be appreciated and understood that there can be any number of devices bound to the logical device elements associated with the RFID process 104. The RFID process 104 can be a generic process that can be marketed and/or deployed to various enterprises (e.g., where there can be a plurality of enterprises, each enterprise having a distinct and/or unique device configuration, layout, and/or physical architecture). The logical device elements can be bound to a physical device, wherein the process of binding takes a process definition and associates devices and/or components to the actual topology and systems configuration that is in an enterprise (e.g., an environment to which the RFID process 104 is to be initiated). Moreover, the binding can be, for instance, the specification of values for initialization parameters of components such as, but not limited to, internal logical elements. For example, the binding can relate to a component that can be defined such as, but not limited to, an event handler. An event handler can be a portion of managed code running in the context of the RFID process 104 that processes a tag event.

In addition, the process of binding can allow Authors (e.g., a user, a process author, an author, a component author, a machine, a ISV, a software manufacturer, a third-party software producer, a programmer, most any suitable machine and/or user that can create a portion of an RFID process, etc.) to supply a process definition and a set of associated component files to customers. This can create a market for RFID business processes and respective vendors. Moreover, an RFID business process can in theory be "sealed", thereby preventing customers from willfully changing the implementation. Thus, the "sealed" RFID business process (e.g., the RFID process 104) can utilize strong typing for component(s) to ensure that a type is specified for an input event and/or an output event. This can allows author's to be guaranteed that their implementation runs as specified in the customer premises. Customers are free to ask the author's for changes to the algorithms implemented by the components published by the authors'. Moreover, the RFID business process can be packaged by the author. Due to the binding architecture, one can package an entire RFID business process and enable shipment of such a process from software vendor to customer. This package can contain the process definition, the bindings and the actual binaries that implement the components. This "deployment" package would significantly cut down the complexity and the time it requires to deploy a RFID business process.

For example, the device (not shown) can receive a signal from at least one tag (not shown) and/or a plurality of tags. In one example, the tag can contain an antenna that provides reception and/or transmission to radio frequency queries from the device. Furthermore, it is to be appreciated that the device can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single device and tag are discussed, it is to be appreciated that a plurality of devices and tags can be utilized with the system 100, wherein the devices can provide a portion of a stream of tag reads and/or writes, a portion of a tag event, a portion of an event, etc.

It is to be appreciated that the RFID process 104 can utilize any suitable number of devices. The RFID process 104 can be related to a particular RFID sub-system (e.g., an RFID server, RFID network, etc.) that is an uber or high-level object that forms together various entities to create a meaningful unit of execution. The RFID process 104 can be and/or can include an outbound process (e.g., pick, pack, shipping scenario, etc.), a manufacturing process, a shipping process, a receiving process, tracking, data representation, data manipulation, data application, security, etc. Additionally, the RFID process 104 can include and/or respond to a device service, a tag read, an event, a tag write, a device configuration, a geographic tracking, a number count, etc. It is to be appreciated that the RFID process 104 can have raw data collected via at least one device, wherein such raw data can be manipulated based at least in part upon a rule and/or a business rule engine (not shown). The RFID process 104 can take a tag event (e.g., a tag read event, an event, a tag write event, etc.) from the device and make the tag event available for at least one high level application (e.g., a component, an event handler, etc.).

For instance, the RFID process 104 can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the RFID process 104 can write to a tag process, wherein a tag can be written in real-time based at least upon an input. The write process can also check if the write succeeded by reading and passing data back to the host.

Moreover, the system 100 can include any suitable and/or necessary interface component 106 (herein referred to as "interface 106"), which provides various adapters, connectors, channels, communication paths, etc. to integrate the strong typing module 102 into virtually any operating and/or database system(s). In addition, the interface 106 can provide various adapters, connectors, channels, communication paths, etc., that provide for interaction with the strong typing module 102, the RFID process 104, the device, the tag, and any other device and/or component associated with the system 100.

Figure 2:
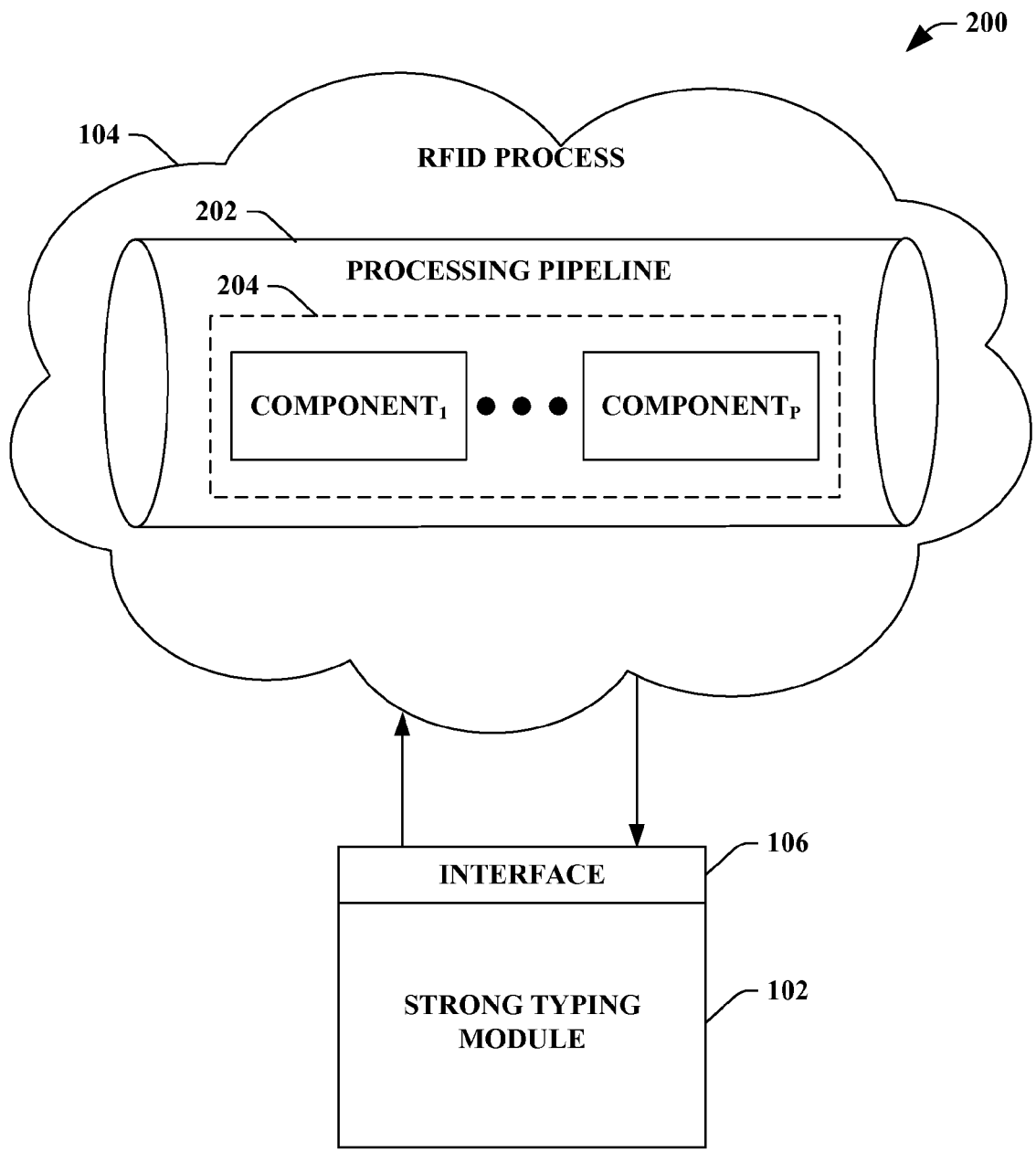
FIG. 2 illustrates a block diagram of an exemplary system that facilitates specifying a type associated with an input event and/or an output event related to at least one component within a processing pipeline.

FIG. 2 illustrates a system 200 that facilitates specifying a type associated with an input event and/or an output event related to at least one component within a processing pipeline. The system 200 can include the strong typing module 102 that can receive data via the interface 106 to enable the definition and/or specification of an event type. In particular, the strong typing module 102 can allow a type of input event that is consumed by a component and/or a type of output event that is generated by a component to be specified. It is to be appreciated that the specification for the input event type and/or the output event type can be provided by a user, a process author, an author, a component author, a machine, a ISV, a software manufacturer, a third-party software producer, a programmer, most any suitable machine and/or user that can create a portion of an RFID process, etc.

The strong typing module 102 can allow a type of an input event and/or a type of an output event to be specified and/or defined such that the event (e.g., input event, output event, etc.) can be linked and/or associated with a particular component (e.g., an event handler) to consume and/or generate. The RFID process 104 can include at least one component, wherein such component can receive an event from a logical source (not shown) raised at execution time. Moreover, the system 200 can include a processing pipeline 202 with at least one assembled component 204. In particular, the processing pipeline 202 can be constructed and/or created by at least one of a user, a process author, an author, a component author, a machine, a ISV, a software manufacturer, a third-party software producer, a programmer, most any suitable machine and/or user that can create a portion of an RFID process, etc. As illustrated, the processing pipeline 202 can include most any suitable number of components such as component $_1$ to component $_P$, where P is a positive integer.

As discussed, the system 200 can utilize a logical source that contains at least one or more logical devices, logical entities, and/or one or more components (e.g., event handlers). The logical devices, logical entities, and/or components can form the processing pipeline 202, wherein a multitude of pipelines can be put together to form an event processing tree. The logical source (LS) can have a LogicalSourceList and a LogicalDeviceList. Each LogicalDeviceList (LDList) can be made up of LogicalDevices (LDs) which can be bound to at least one of a DeviceGroupList, a DeviceList, and a RegexCollection (e.g., regular expression (Regex). The LogicalDevice (e.g., which can also have a name and/or disparate reference) can allow a component in the RFID process pipeline (e.g., processing pipeline 204) to have some business context for a physical device. For instance, an event handler (e.g. a component) can decide to do one event if the physical device of the tag belongs to the "Shipping" LogicalDevice, and it can further do some other event if the physical device belongs to the "Receiving" LogicalDevice. Accordingly, TagReadEvent.ServerTag.DeviceCollectionName can also be referred to TagReadEvent.ServerTag.LogicalDeviceName. In one scenario, the LS can directly have a DeviceGroupList, a DeviceList, and a RegexCollection and not have the concept of a LogicalDevice.

Furthermore, the RFID process 104 can be a business process, wherein the devices can be indirectly utilized in association with the business process. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time. In another example, an RFID host can utilize a business rules engine (not shown), wherein such business rules engine can provide a rule-based system in association with any application such that a filter and/or alert can be utilized as a rule(s). The business rules engine can execute declarative filters and/or alerts as rules, wherein the rules can include a rule set adhered to an event, condition, and action format utilizing an extensible markup language (XML). The rule can be at least one of the following: contained within a rule set that adheres to an event, a condition, or an action; or represented utilizing an extensible markup language (XML). Moreover, the condition can have at least one of a set of predicates and a logical connective to form a logical expression that evaluates to one of a true and a false.

The device (not shown) and the tag (not shown) can be associated with a physical RFID network (not shown), wherein the physical RFID network can be implemented by any enterprise, business, facility, and/or any suitable entity that can utilize RFID technology. For instance, the physical RFID network can be deployed to include any number of devices such as device $_1$ to device $_N$, where N is positive integer. Moreover, such devices can interact (e.g., wirelessly communicate) with any number of tags such as tag $_1$ to tag $_M$, where M is a positive integer. In addition, the device can be associated with at least an antenna to communicate data. Furthermore, it is to be appreciated that the tags can be associated to any suitable object related to the enterprise, business, facility, and/or any suitable entity utilizing such RFID technology. Moreover, although only a single RFID process 104 is depicted, it is to be appreciated that a plurality of RFID processes can be executed in conjunction with the device. For instance, the process can be a shipping process that is related to the devices at the shipping door, wherein the devices can collect data at such location. Similarly, another process can be a receiving process that is related to the devices at the receiving door, wherein the devices can collect data at such location.

Figure 3:
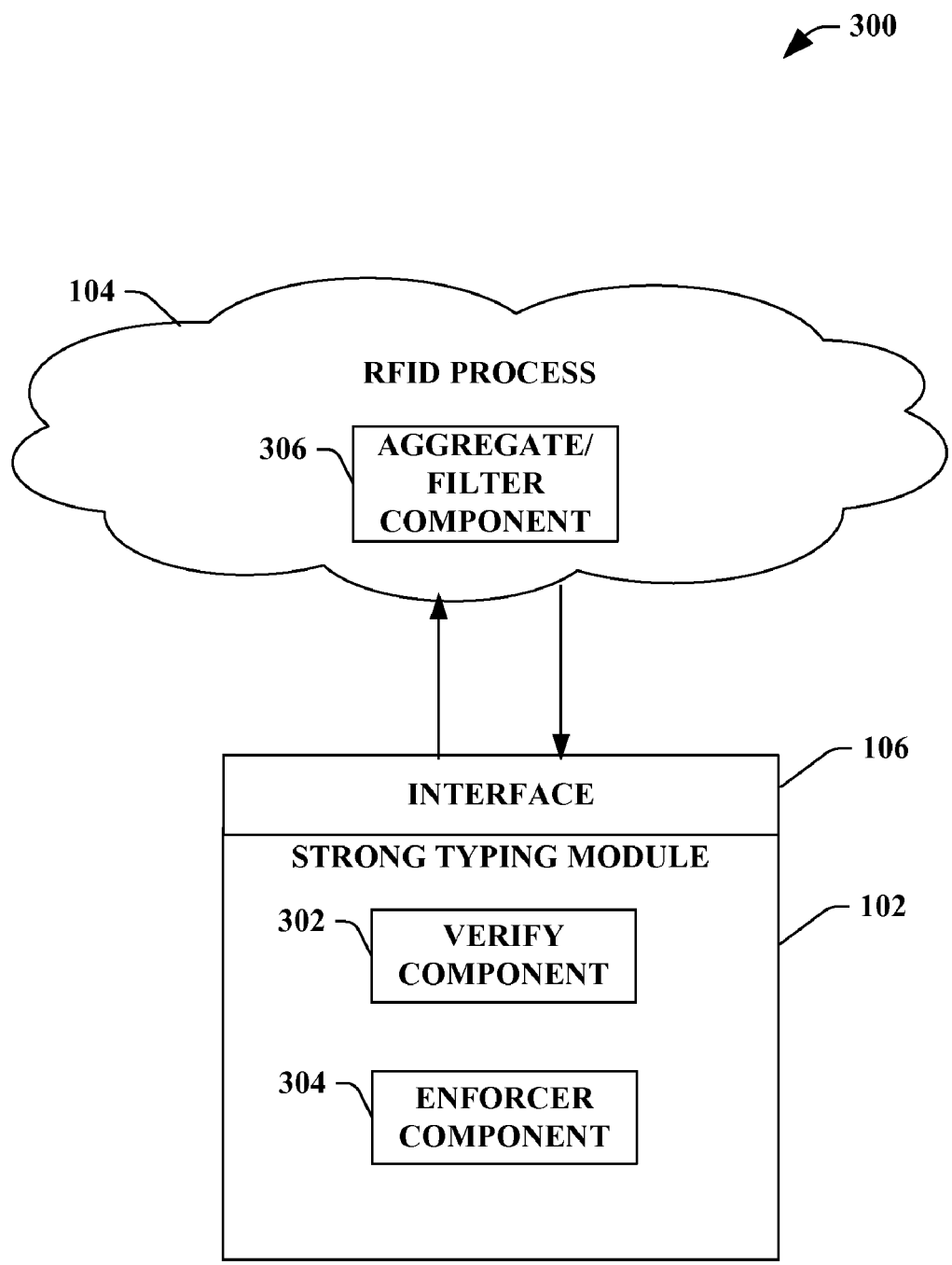
FIG. 3 illustrates a block diagram of an exemplary system that facilitates verifying data utilizing strong typing for a component related to an RFID process.

FIG. 3 illustrates a system 300 that facilitates verifying data utilizing strong typing for a component related to an RFID process. The system 300 can include the strong typing module 102 that can enable strong typing in connection with a component and/or an event handler, wherein such strong typing can specify at least one of an input event type for consumption and/or an output event type for generation. Moreover, the strong typing module 102 can provide a definition for each event related to the RFID process 104 to ensure each event is accounted for and no event mismatching occurs. In other words, by specifying a type for each event and linkage with a component, all events can be accounted for and there will be no orphaned events and/or components associated with the RFID process 104. In addition, the strong typing module 102 can employ at least one of the following: an algorithm to traverse a process pipeline and ensure matching of an event type between an adjacent component (e.g., event handler); detection of an unreachable component (e.g., event handler); reporting an error associated with a component and an event and/or a component and the processing pipeline; a data structure and/or an algorithm to put an event through a processing pipeline when a process is started; filtering based on a relevant type; or aggregation of most any type of event.

The strong typing module 102 can include a verify component 302 (e.g., a module within and/or utilized by the strong typing module) that can verify correct composition of at least one process pipeline at and/or during design time. By utilizing strong typing with a component (e.g., specifying each type of event related to the RFID process 104), no errors with regard to event mismatches will be encountered when the RFID process 104 is deployed. In particular, the strong typing module 102 can enforce the strong typing which allows the verify component 302 to ensure when a process is started at least one of the following: the component in the processing pipeline receives an event; the component is bound to a logical source; or the logical source itself receives an event. It is to be appreciated that the verify component 302 can be a stand-alone component, incorporated into the strong typing module 102 (as depicted), incorporated into the RFID process 104, and/or most any suitable combination thereof.

The system 300 can further include an enforcer component 304. The enforcer component 304 provides at least one rule to be maintained in connection with the strong typing module 102 enabling strong typing of components. In particular, the enforcer component 304 employs a rule related to a component, wherein such rules enable efficient and optimal use of component strong typing. Although the enforcer component 304 is depicted as being incorporated into the strong typing module 102, it is to be appreciated that the enforcer component 304 can be a stand-alone component, incorporated into the strong typing module 102, incorporated into the RFID process 104, and/or most any suitable combination thereof.

The following rules can be implemented by the enforcer component 304 but it is to be appreciated that such listing of rules are not exhaustive and the subject innovation can include most any suitable rule to utilize strong typing of components associated with the RFID process 104 and/or an RFID network (e.g., an RFID physical device network). The enforcer component 304 can implement at least one of the following rules: public parameter less constructor can be required for each component; a component method can be an instance method and public; the input type can be one of an RfidEventBase (or any of its subclasses) or RfidEventBase[ ] (or one of its subclasses); the output type can be void, RfidEventBase, or RfidEventBase[ ] or one of their subclasses; a processing pipeline can terminate in the middle at runtime, such termination will generate a warning (e.g., to a log file); null values can be considered to be part of the typesystem and will act as terminators for the event pipeline; empty arrays will behave the same as null values; given that a component has methods m1, m2 and m3, the first method can be invoked in the first component using the dynamic type of the event; if the first step has Tag as an input (and not TagList) and a provider reports a TagList, the event can be automatically shred and the tags can be posted as individual reads through the pipeline—such posting can be done in the same transaction for the entire tag list if transactional processing is underway; all subsequent invocations can be done using the STATIC type of the method (e.g., the branches through the pipeline are known at compile time, and the tree only narrows as the pipeline is navigated/executed); all subsequent invocations can be within the typesystem, there can be no implicit batching and/or shredding of the event lists—such implicit batching and/or shredding can result in an exception; if the input type of the current component is a subtype of the output type of the previous component, an explicit cast can be added to the event pipeline and the type can be checked at runtime for conformance; if the output type of the previous component matches more than one input type for the current component, it will be treated as an error; if the output type of the previous component is an array and the next step in the pipeline needs a subclass of the array, a clone of the array can be created if needed and check the type of each element; or there should not be any unreachable component—a component is unreachable, if there is no path an event (starting from a logical device) can take to use one of its methods (e.g., a component placed after the out of the box SqlServerSink is unreachable since all methods of SqlServerSink return void).

The system 300 can further include an aggregate/filter component 306. For instance, the aggregate/filter component 306 can create a relevant type table. In general, the aggregate/filter component 306 can construct a table based at least in part upon the event input types and/or event output types of the RFID process 104. Such generated table can be utilized to filter an event early in the design process (e.g., binding the RFID process to internal logical elements such as a component, event handler, etc.) which can enhance performance of the system 300 and/or the RFID process 104. Moreover, the aggregate/filter component 306 can enable a component (e.g., an event handler) to aggregate most any type of event. For example, the output type can be an array of events, wherein such array of events can be utilized by the aggregate/filter component 306 to signify they are semantically related. Based on such relation, subsequent components (e.g., event handlers) can process them accordingly.

For example, the RfidEventHandlerBase can utilize an abstract method that can be implemented (e.g., HandleTagReadEvent, HandleGenericEvent, etc.). The methods can return RfidEventBase[ ] even if they had to return only one event. The returned events could be TagReadEvents, TagListEvents, a mixture of the two or anything that derived from RfidEventBase. If a process pipeline had more than one component, just by looking at the event processing method signatures, it was hard to deduce, which path an event might take. Moreover, it was also hard to verify if any two event handlers could be hooked up in a pipeline. Thus, the implementation of strong typing described in the subject innovation can alleviate such issues.

For instance, an author (e.g., a user, a process author, an author, a component author, a machine, a ISV, a software manufacturer, a third-party software producer, a programmer, most any suitable machine and/or user that can create a portion of an RFID process, etc.) can write a method with a signature (e.g., an input and/or an output type that a component actually consumes and/or produces). For example, if a method handles TagReadEvents and outputs TagReadEvents, it could have the following signature:

[RfidEventHandlerMethod]

public TagReadEvent TagReadEventHandler(TagReadEvent tagReadEvent)

RfidEventHandlerMethod attribute can be used to denote which methods on the event handler should be used for event processing. RfidServices can look at the components and hook up the methods based on input and output types. The path that an event takes can be determined statically (e.g. when a SaveProcess is done and not during process execution).

It is to be appreciated that there can be errors associated with the implementation of strong typing of components. For example, a component can have two methods, wherein the input parameter of one method is a base class of the input type of another parameter. If an event of the base type is received, it cannot be determined which of the methods to call, hence, this is an error. In another example, a component's output type can match the input parameters of two component methods of the following component. If an event of the output type is received, it cannot be ascertained which method to call and is an error.

Figure 4:
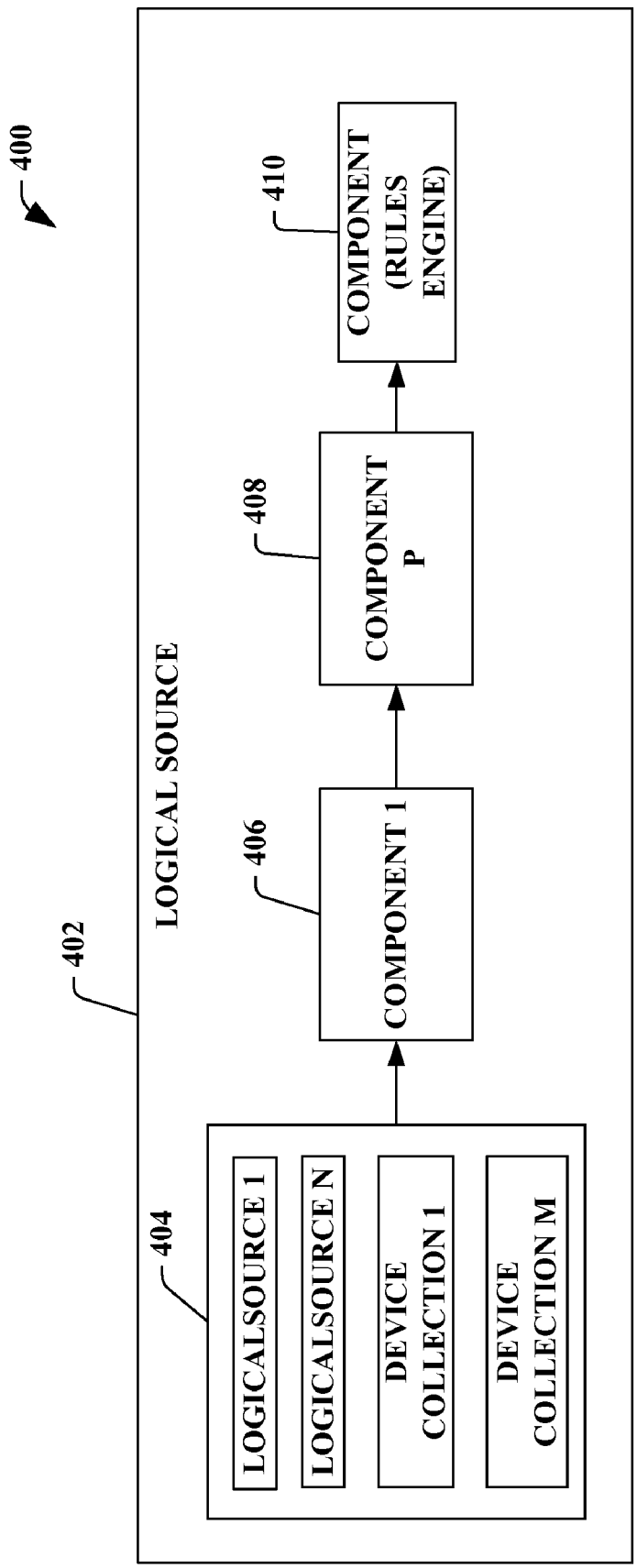
FIG. 4 illustrates a block diagram of a logical source in accordance with the subject innovation.

Turning briefly to FIG. 4, a diagram 400 of a logical source 402 is illustrated that can be utilized to build an RFID application and/or process. In particular, a logical source 402 is a stream of tag reads and/or writes. The stream of reads and/or writes can be processed and result in a different stream of reads and/or writes. It is to be appreciated that the logical source 402 can recursively embed at least one other logical source. A group of events and/or tag reads 404 can be sent to a component 406, where optional filters and/or alerts can be executed. The group of events and/or tag reads 404 can be N logical sources, where N is greater than or equal to one, and/or M device collections, where M is greater than or equal to one. After the component 406, the group of events and/or tag reads 404 can be passed to a disparate component 408. There can be N number of components 408, where N is greater than or equal to one. Moreover, the component 408 can be an event handler (not shown). It is to be further appreciated that a component (e.g., a rules engine) 410 can be employed with the subject innovation, wherein the component 410 (e.g. rules engine) can handle events after they are passed to the components 406 and 408.

The event handler (e.g. a component) can manage an event from a logical source 402. The event handler can be utilized for at least one of the following: apply logic in real-time on tag read events and/or enrich the event in a specific manner; consume an event by a higher level application; write back to a tag when a blank tag read event is detected; etc. The event handler can specify actions when exceptions occur such as, but not limited to, a read error and a write error. It is to be understood that the exceptions can be from the logical source 402 during execution (e.g., managing a process specific event).

Figure 5:
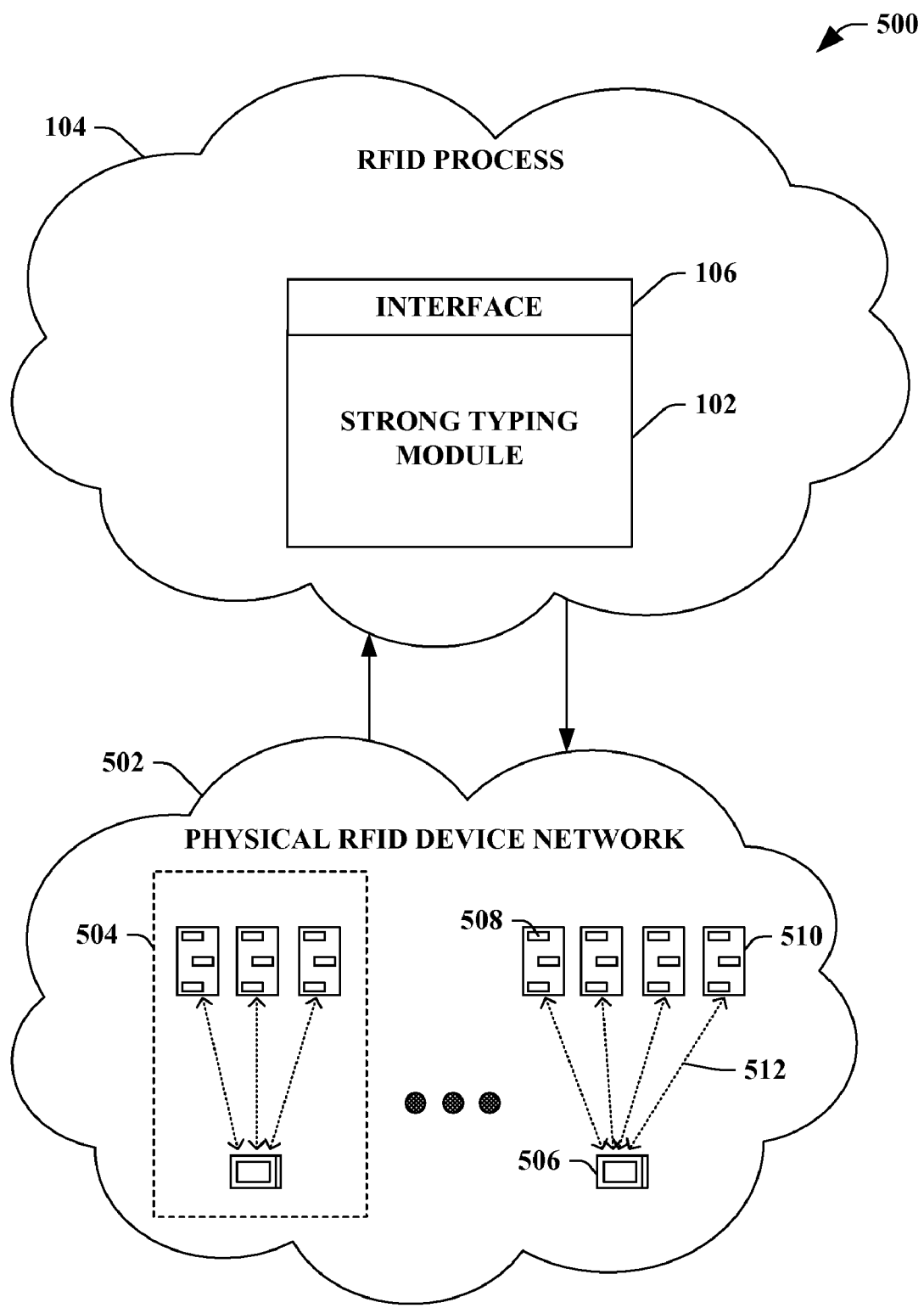
FIG. 5 illustrates a block diagram of an exemplary system that facilitates implementing strong typing for a component to be utilized with a physical RFID device network.

FIG. 5 illustrates a system 500 that facilitates implementing strong typing for a component to be utilized with a physical RFID device network. The strong typing module 102 can enforce strong typing for a component such that a type of event is specified and/or defined to facilitate ensuring an event is consumed and/or generated by a particular component. In other words, the strong typing module 102 can receive data via the interface 106 which can define a linkage between at least one event and at least one component related to the RFID process 104, wherein the RFID process 104 can be utilized with at least one device within an RFID physical device network 502 (also referred to as the RFID network 502).

The RFID network 502 can include a plurality of universes (e.g., sub-systems, RFID networks), wherein a universe is a server of RFID entities. For simplicity, the RFID network 502 illustrates a single universe containing two collections of devices (e.g. device collections), where a first collection 504 is shown. It is to be appreciated that the device collections can correspond to device groups, wherein such collections and/or groups can be based on at least one of the following: device physical location, device functionality, device security level, process device association, make and/or model of device, type of device, device frequency, etc. For instance, an RFID sub-system can be a location wherein the entities involved are related to a substantially similar process. In one example, a sub-system can be a warehouse containing a plurality of receiving and/or shipping dock doors with associated devices. Thus, first collection 504 can be a collection of devices within the specified sub-system. It is to be appreciated a plurality of collection of devices can be implemented. Within a collection of devices, a device 506 can receive an RFID signal 512 from a pallet of goods 510 containing at least one RFID tag 508. It is to be appreciated the pallets and/or goods can be tagged based at least upon user specifications (e.g. single pallets tagged, individual goods tagged, pallets and goods tagged, etc.).

Figure 6:
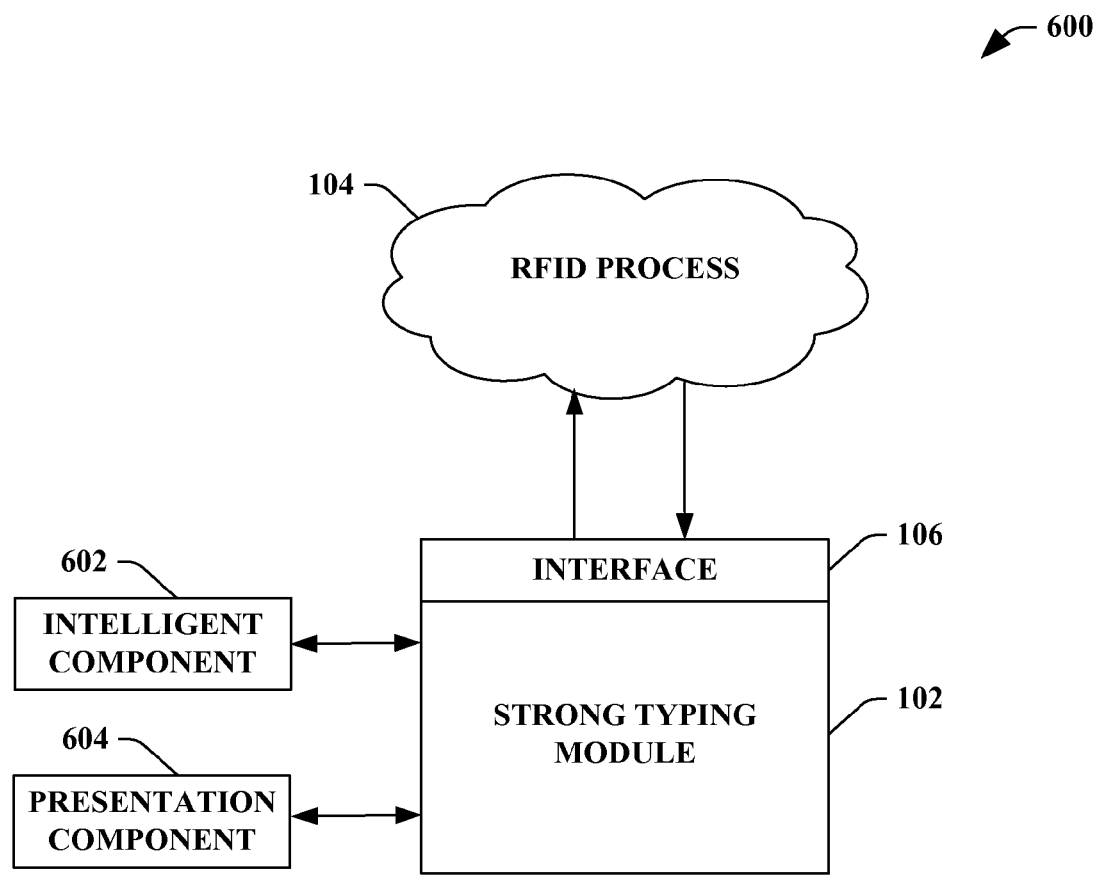
FIG. 6 illustrates a block diagram of an exemplary system that facilitates ensuring accurate input event consumption and/or output event generation associated with an RFID process.

FIG. 6 illustrates a system 600 that employs intelligence to facilitate ensuring accurate input event consumption and/or output event generation associated with an RFID process. The system 600 can include the strong typing module 102, the RFID process 104, and the interface 106. It is to be appreciated that the strong typing module 102, the RFID process 104, and the interface 106 can be substantially similar to respective modules, processes, interfaces, devices, and tags described in previous figures. The system 600 can further include an intelligent component 602. The intelligent component 602 can be utilized by the strong typing module 102 to facilitate ensuring a component consumes and/or generates a specified type of input event and/or output event which allows event mismatching to incorrect components to be eliminated. For example, the intelligent component 602 can infer component data, component and event linkage and/or association, event type, input event type, output event type, event generation for a component, event consumption for a component, event handler data, processing pipeline data, RFID process data, binding data, relevant type data, event type aggregation, verification of processing pipeline composition, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The strong typing module 102 can further utilize a presentation component 604 that provides various types of user interfaces to facilitate interaction between a user and any component coupled to the automatic software deployment component 102. As depicted, the presentation component 604 is a separate entity that can be utilized with the strong typing module 102. However, it is to be appreciated that the presentation component 604 and/or similar view components can be incorporated into the strong typing module 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the strong typing module 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
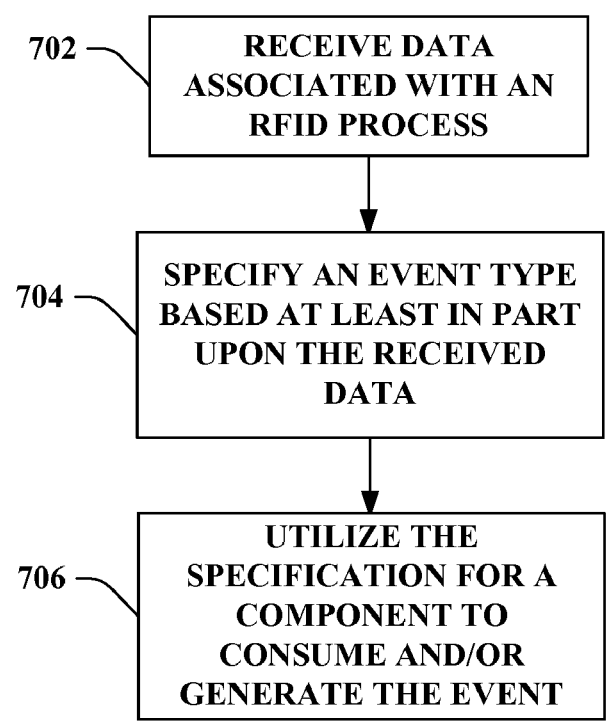
FIG. 7 illustrates an exemplary methodology that facilitates employing strong typing with at least one component associated with an RFID process.
Figure 8:
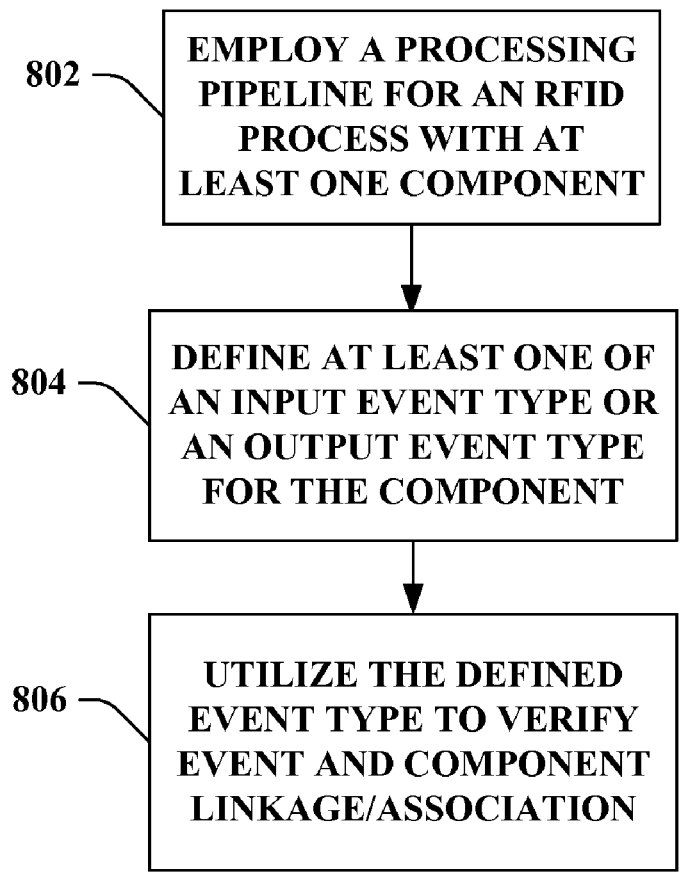
FIG. 8 illustrates an exemplary methodology for specifying a type associated with an input event and/or an output event related to at least one component within a processing pipeline.

FIGS. 7-8 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 that facilitates employing strong typing with at least one component associated with an RFID process. At reference numeral 702, data associated with an RFID process can be received. The received data can be, but is not limited to being, a type of input event to be consumed, a type of output event to be generated, a type of an event, a type and a component association/linkage, data received from a component author (e.g., a user, a process author, an author, a component author, a machine, a ISV, a software manufacturer, a third-party software producer, a programmer, most any suitable machine and/or user that can create a portion of an RFID process, etc.), programming data related to the RFID process, processing pipeline data, component data, internal logical element/device data, most any suitable data related to the RFID process 104, etc. The RFID process can be related to a particular RFID subsystem (e.g., an RFID server, RFID physical device network, etc.) that is an uber or high-level object that forms together various entities to create a meaningful unit of execution. The RFID process can be and/or can include an outbound process (e.g., pick, pack, shipping scenario, etc.), a manufacturing process, a shipping process, a receiving process, tracking, data representation, data manipulation, data application, security, etc. Additionally, the RFID process can include and/or respond to a device service, a tag read, an event, a tag write, a device configuration, a geographic tracking, a number count, etc. It is to be appreciated that the RFID process can have raw data collected via at least one device, wherein such raw data can be manipulated based at least in part upon a rule and/or a business rule engine (not shown). The RFID process can take a tag read event from a device and make the tag read event available for at least one high level application.

For instance, the RFID process can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the RFID process can write to a tag process, wherein a tag can be written in real-time based at least upon an input. The write process can also check if the write succeeded by reading and passing data back to the host.

At reference numeral 704, an event type can be specified based at least in part upon the received data. By defining and/or specifying the type of event, strong typing of a component can be employed. In particular, the input event type to be consumed can be specified. Moreover, the output event type to be generated can be specified. At reference numeral 706, the specification can be utilized for a component to consume and/or generate the event. In other words, the strong typing of a component can ensure a particular input event type is consumed by a component (e.g., an event handler, a portion of managed code running/executing within the context of an RFID process, etc.) and/or a particular output event type is generated by a component (e.g., an event handler, a portion of managed code running within the context of an RFID process, etc.). For example, the strong typing of a component can allow a type of event to be specifically defined which enables a distinct and explicit manner to ensure an event is handled by a component (e.g., an event handler, a portion of managed code running within the context of an RFID process, etc.).

FIG. 8 illustrates a methodology 800 for specifying a type associated with an input event and/or an output event related to at least one component within a processing pipeline. At reference numeral 802, a processing pipeline for an RFID process can be employed with at least one component. It is to be appreciated that the component (e.g., an event handler, a portion of managed code running in context of the RFID process, etc.) can receive an event from a logical source. For instance, the processing pipeline related to the RFID process can be constructed and/or generated by a user, a process author, an author, a component author, a machine, a ISV, a software manufacturer, a third-party software producer, a programmer, most any suitable machine and/or user that can create a portion of an RFID process, etc. In general, the RFID process can be related to a particular RFID sub-system (e.g., an RFID server, RFID physical device network, etc.) that is an uber or high-level object that forms together various entities to create a meaningful unit of execution. In one example, the RFID process can be a business process, wherein devices can be indirectly utilized in association with the business process. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time.

In another example, an RFID host can utilize a business rules engine (not shown), wherein such business rules engine can provide a rule-based system in association with any application such that a filter and/or alert can be utilized as a rule(s). The business rules engine can execute declarative filters and/or alerts as rules, wherein the rules can include a rule set adhered to an event, condition, and action format utilizing an extensible markup language (XML). The rule is at least one of the following: contained within a rule set that adheres to an event, a condition, and an action; and represented utilizing an extensible markup language (XML). Moreover, the condition has at least one of a set of predicates and a logical connective to form a logical expression that evaluates to one of a true and a false.

At reference numeral 804, at least one of an input event type or an output event type can be defined for the component. By specifying the type of event for a particular component, each event can be linked and/or associated with a component without the possibility of orphaned events and/or components that do not receive and/or generate at least one event. By ensuring such linkage and/or association, RFID process errors can be mitigated. Moreover, such specification can be during design time, wherein the design time can be the process of conceptualizing the RFID process by specifying logical device elements, specifying logical sources as containers for logical device elements, and/or creating a pipeline of components (e.g., event handlers) such that a component can receive an event from a logical source.

At reference numeral 806, the defined event type can be utilized to verify event and component linkage and/or association. Based on each event having a defined type, the event can be related to a particular component. Such identifying data enables the RFID process to ensure each event associated therewith can be accounted. Moreover, the processing pipeline can be verified for correct composition at and/or during design time. Thus, when the RFID process is deployed, the process will not encounter an error related to event mismatches. Furthermore, a component in the pipeline can be ensured to receive an event at runtime. Still further, the component can be verified to be bound to a logical source and the source itself receives an event.

Figure 9:
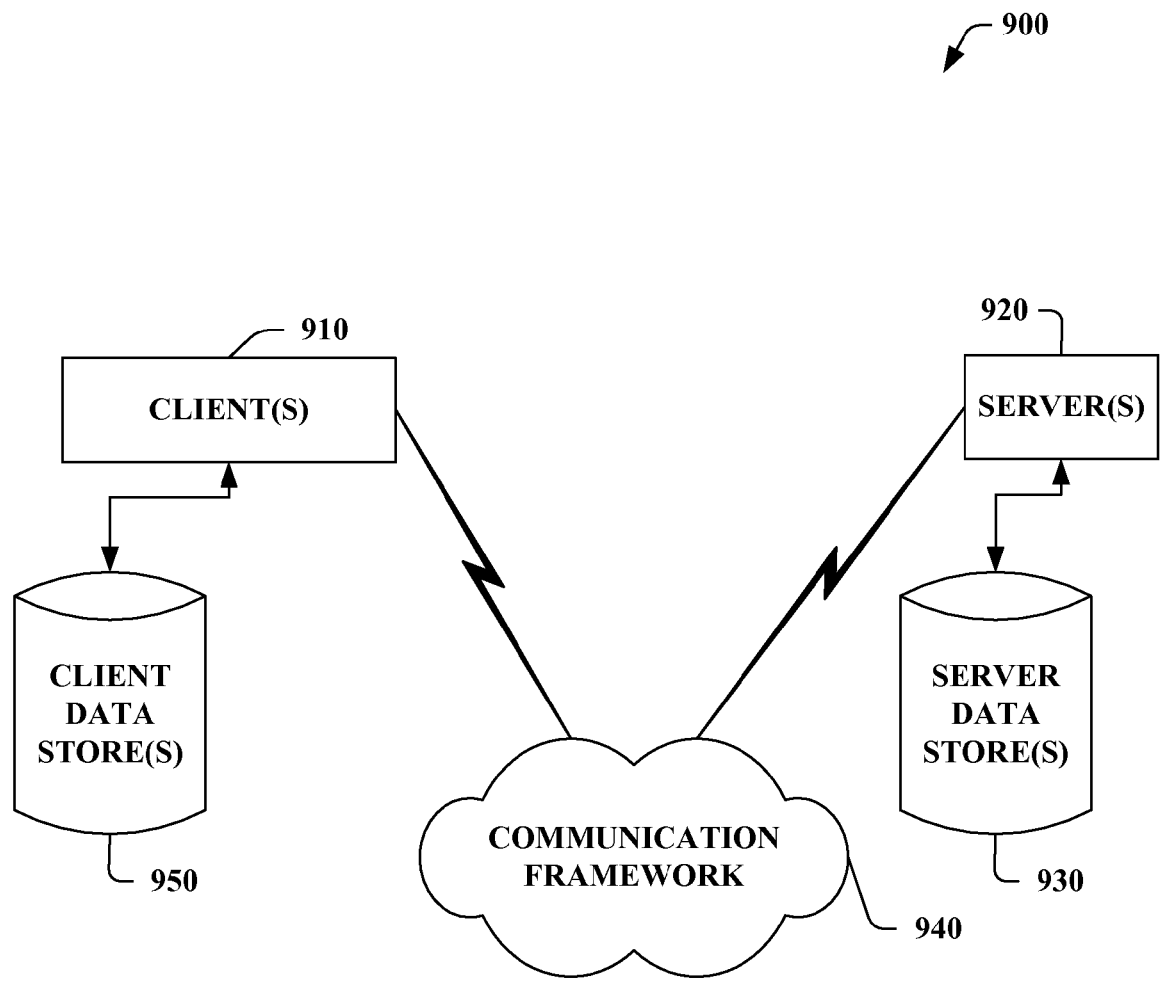
FIG. 9 illustrates an exemplary networking environment, wherein the novel aspects of the claimed subject matter can be employed.
Figure 10:
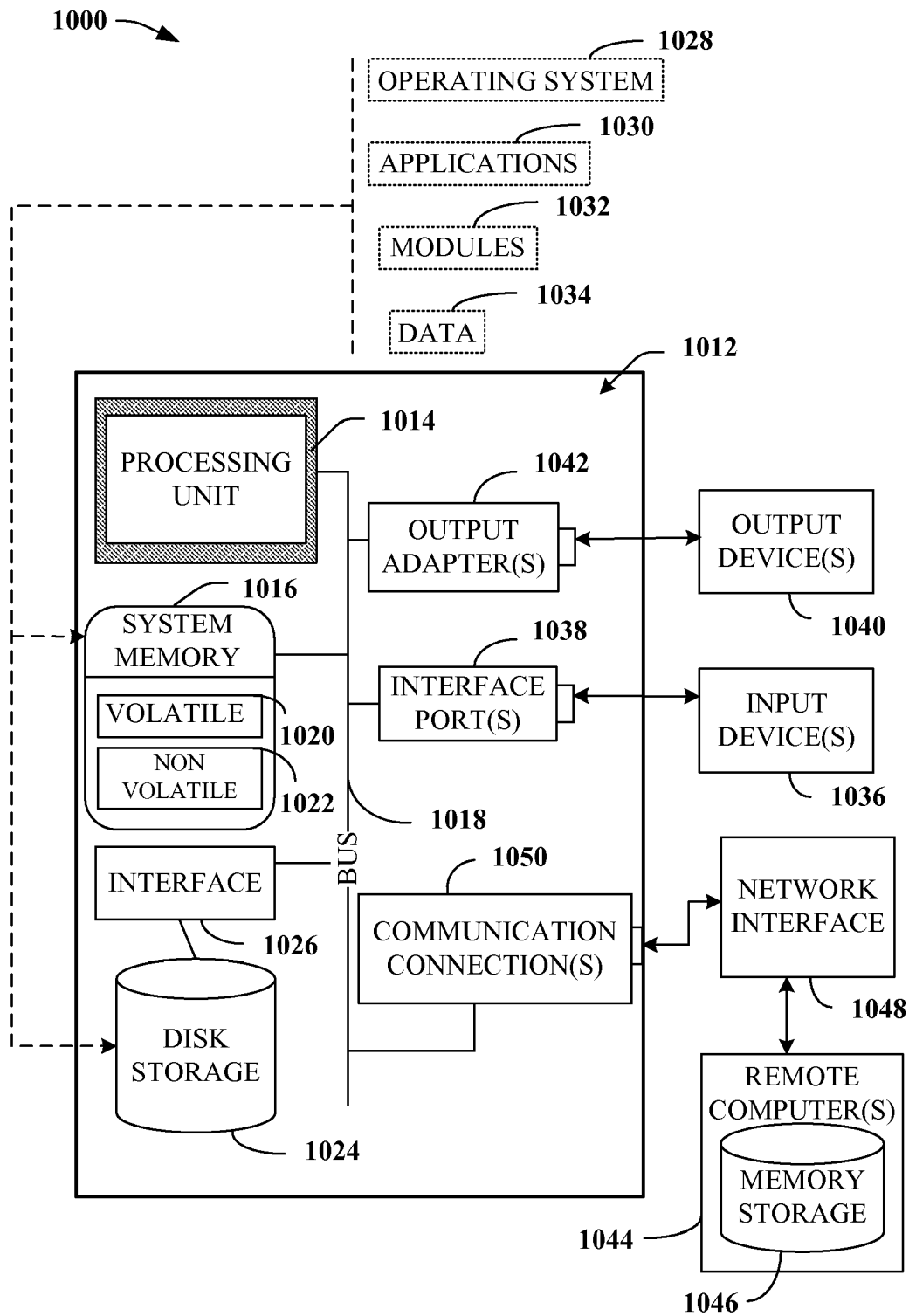
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a strong typing module that facilitates receiving data to specify an input event type and/or an output event type for a component and/or an event handler associated with a radio frequency identification (RFID) process, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 940 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates verifying data within a radio frequency identification (RFID) business process, comprising:
   a radio frequency identification (RFID) business process includes at least one component configured to receive an event from a logical source; and
   a strong typing module configured to employ strong typing of the at least one component that defines at least one of an event type for the at least one component, an input event type for the at least one component, or an output event type for the at least one component.

2. The system of claim 1, the at least one component is configured to receive the event from a physical device bound to a logical device element.

3. The system of claim 2, the logical source is a container for the logical device element.

4. The system of claim 2, the physical device is at least one of the following: an RFID printer; a reader; a writer; an RFID transmitter; an antenna; a sensor; a real-time device; an RFID receiver; a device extensible to a web service; or a real-time event generation system.

5. The system of claim 1, the RFID business process is a high-level object configured to form together at least one entity to create a unit of execution that relates to at least one of the following: an outbound process; a manufacturing process; a shipping process; a receiving process; a tracking process; a data representation process; a data manipulation process; a security process; or a process utilizing one of an RFID device service, a device collection, a tag read, an event, an event queue, a tag write, a device configuration, or a number count.

6. The system of claim 1, a type specification allows at least one of a consumption of the input event type or a generation of the output event type.

7. The system of claim 1, the at least one component is at least one of an internal logical element or an event handler.

8. The system of claim 7, the event handler is a portion of managed code running in a context of the RFID business process that processes the event.

9. The system of claim 1, the strong typing module is configured to employ the strong typing at design time, the design time includes a process of conceptualizing the RFID process by specifying at least one of the following: a logical device element; a logical source as a container for the logical device element; or a processing pipeline with a pipeline component configured to receive the event from the logical source.

10. The system of claim 1 further comprising a processing pipeline assembled with a pipeline component.

11. The system of claim 10, at least one of the processing pipeline or a type definition is provided by one of the following: a user; an author; a machine; an independent software vendor (ISV); a software manufacturer; a third-party software producer; or a programmer.

12. The system of claim 1, further comprising a verify component configured to verify at least one of the following: a correct composition of at least one process pipeline at design time; no errors exist with regard to an event mismatch upon deployment of the RFID business process; the processing pipeline receives an event at runtime; the at least one component is bound to the logical source at runtime; or the logical source itself receives the event at runtime.

13. The system of claim 1, further comprising an aggregate/filter component configured to enable at least one of the following: a creation of a table based at least in part upon a type definition, the table is utilized to filter at least one event; or an aggregation of a plurality of event types, the aggregation signifies a semantic relationship for subsequent component processing.

14. The system of claim 1, further comprising an enforcer component configured to maintain at least one rule related to the at least one component.

15. The system of claim 1, the strong typing module configured to implement at least one of the following: an algorithm to traverse a process pipeline to ensure matching of an event type between an adjacent component; a detection of an unreachable component; a reporting of an error associated with at least one of a component and an event or a component and a processing pipeline; at least one of a data structure or an algorithm to put an event through a processing pipeline at runtime; a filtering based on a relevant type; or an aggregation of a plurality of event types.

16. The system of claim 1, further comprising a physical device within an RFID network that comprises a collection of devices that form a sub-system which includes:
   an RFID reader configured to receive an RFID signal; and
   an RFID tag configured to transmit to at least one device.

17. A computer-implemented method that facilitates maintaining data consistency related to a radio frequency identification (RFID) process, comprising:

employing a processor to execute computer executable instructions stored on a computer readable storage medium to implement the following acts:
  receiving data associated with an RFID process;
  specifying a specification that specifies a type of an event based at least in part upon the received data; and
  utilizing the specification for a component to at least one of consume or generate the event.

18. The method of claim 17, further comprising utilizing the specification to verify at least one of the following: a correct composition of at least one process pipeline at design time; no errors exist with regard to an event mismatch upon deployment of the RFID process; the at least one process pipeline receives the event at runtime; the component is bound to a logical source at runtime; or the logical source itself receives the event at runtime.

19. The method of claim 17, further comprising employing the specification at design time, the design time is a process of conceptualizing the RFID process by specifying at least one of the following: a logical device element; a logical source as a container for the logical device element; or a processing pipeline with a pipeline component configured to receive the event from a logical source.

20. A computer-readable storage medium that facilitates implementing strong typing related to a radio frequency identification (RFID) business process, comprising:
  computer-readable instructions, the computer-readable instructions including instructions for causing at least one processor to perform the following acts:
  receiving data related to an RFID business process, the RFID business process includes at least one component that receives an event from a logical source; and
  employing strong typing of the at least one component to define at least one of an event type for the at least one component, an input event type for the at least one component, or an output event type for the at least one component based on the received data.

* * * * *